(12) United States Patent
Takeda et al.

(10) Patent No.: US 9,416,881 B2
(45) Date of Patent: Aug. 16, 2016

(54) HIGH TEMPERATURE GATE VALVE

(71) Applicant: KUBOTA CORPORATION, Osaka-shi, Osaka (JP)

(72) Inventors: Susumu Takeda, Hirakata (JP); Kohei Mori, Hirakata (JP); Yasutaro Yoshida, Hirakata (JP)

(73) Assignee: KUBOTA CORPORATION, Osaka (JP)

(*) Notice: Subject to any disclaimer, the term of this patent is extended or adjusted under 35 U.S.C. 154(b) by 127 days.

(21) Appl. No.: 14/264,350

(22) Filed: Apr. 29, 2014

(65) Prior Publication Data

US 2014/0231691 A1     Aug. 21, 2014

Related U.S. Application Data

(63) Continuation of application No. PCT/JP2013/068812, filed on Jul. 10, 2013.

(30) Foreign Application Priority Data

Oct. 15, 2012   (JP) .................................. 2012-227563

(51) Int. Cl.
  *F16K 3/316*   (2006.01)
  *F16K 3/30*    (2006.01)
  (Continued)

(52) U.S. Cl.
  CPC ...  *F16K 3/30* (2013.01); *F16K 3/12* (2013.01); *F16K 3/316* (2013.01); *F16K 27/047* (2013.01)

(58) Field of Classification Search
  CPC ............. F16K 3/30; F16K 3/12; F16K 3/316; F16K 27/047

USPC ................................... 251/203, 326, 327, 329
See application file for complete search history.

(56) References Cited

U.S. PATENT DOCUMENTS 1,955,007 A * 4/1934 McClay .................. F16K 15/02
                                                    137/512.1
3,701,359 A   10/1972 Worley et al.
(Continued)

FOREIGN PATENT DOCUMENTS

CN          2373643       4/2000
JP          49-39827      4/1974
(Continued)

OTHER PUBLICATIONS

Search Report dated Aug. 6, 2013 from International Application No. PCT/JP2013/068812.
(Continued)

*Primary Examiner* — John K Fristoe, Jr.
*Assistant Examiner* — Richard K Durden
(74) *Attorney, Agent, or Firm* — Beyer Law Group LLP (57) ABSTRACT

A high temperature gate valve includes a valve body, a valve element configured to open and close a flow path, and a guide member which is provided in the valve body and guides the valve element in an opening/closing direction. The valve body includes a valve body main portion and a bonnet portion. The valve element slides along the opening/closing direction guided by the guide member. The valve element at a shut-off position blocks the flow path by projecting into the valve body main portion, and at an open position retracts into the bonnet portion. The guide member is divided into a plurality of divided guiding elements along the opening/closing direction, and each of the divided guiding elements are welded to an inside of the valve body.

11 Claims, 10 Drawing Sheets

(51) Int. Cl.
　　*F16K 3/12*　　(2006.01)
　　*F16K 27/04*　　(2006.01)

(56) References Cited

U.S. PATENT DOCUMENTS

| | | | |
|---|---|---|---|
| 6,425,630 B1 * | 7/2002 | Mathias | B60J 7/02 296/216.01 |
| 8,181,935 B2 * | 5/2012 | Haberhauffe | F16K 3/316 251/118 |

FOREIGN PATENT DOCUMENTS

| | | |
|---|---|---|
| JP | (U) 62-134630 | 8/1987 |
| JP | (U) 4-134980 | 12/1992 |
| JP | 11-173459 | 6/1999 |
| JP | 2012-97592 | 5/2012 |

OTHER PUBLICATIONS

Office Action dated Dec. 4, 2015 from CN 201380009201.1.

* cited by examiner

HIGH TEMPERATURE GATE VALVE

CLAIM OF PRIORITY

This application is a Continuation of International Patent Application No. PCT/JP2013/068812, filed on Jul. 10, 2013, which claims priority to Japanese Patent Application No. 2012-227563, filed on Oct. 15, 2012, each of which is hereby incorporated by reference.

BACKGROUND OF THE INVENTION

1. Field of the Invention

The present invention relates to a high temperature gate valve, for example, having a disc-shaped valve element.

2. Description of the Related Art

Figure 10:
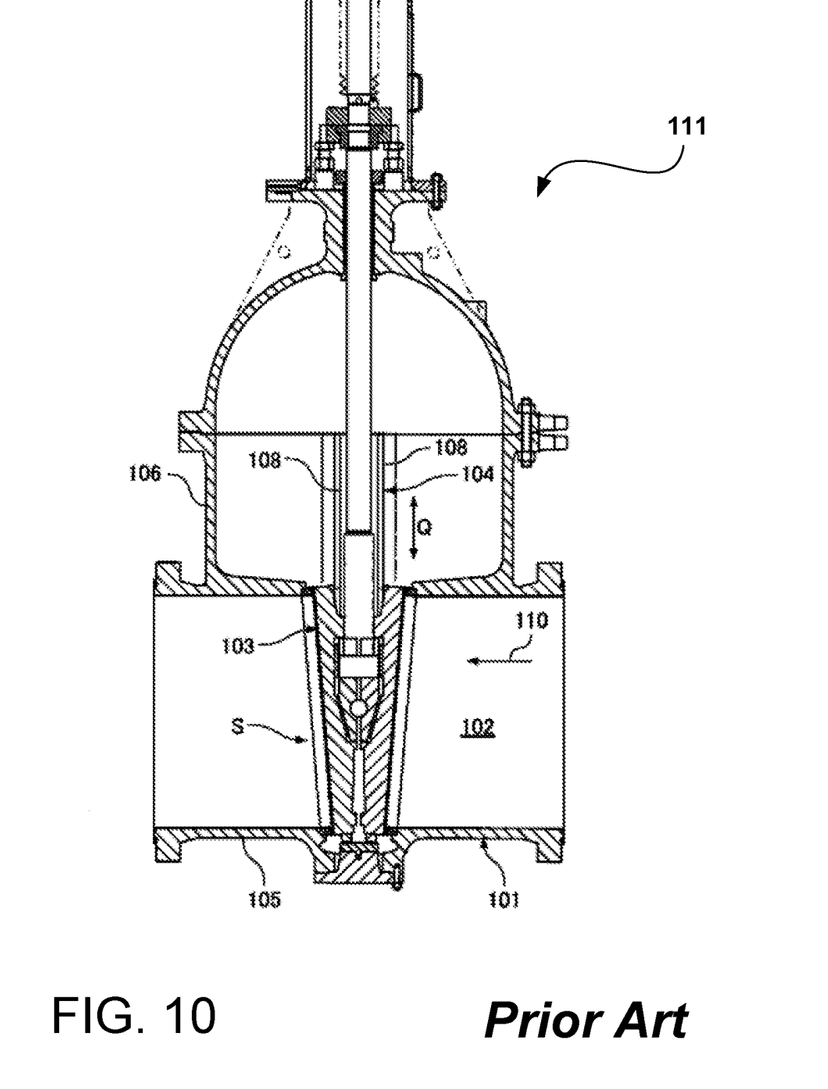
FIG. 10 is a diagram showing a cross-sectional view of a conventional high temperature gate valve.
Figure 11:
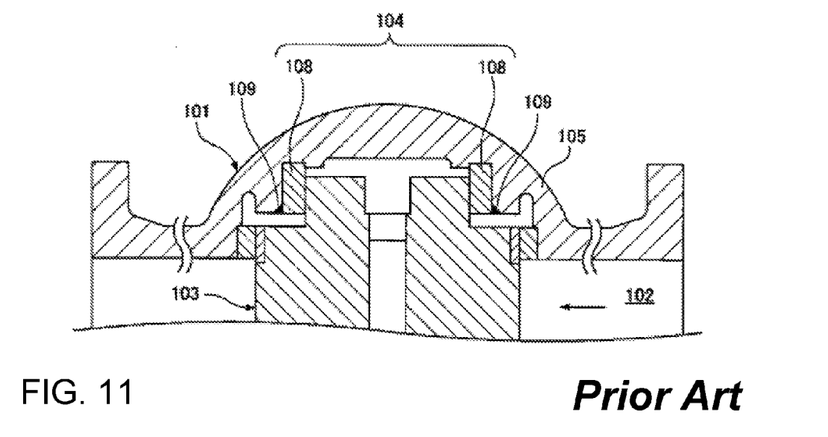
FIG. 11 is a diagram showing a cross-sectional view of a main portion (guide rail) of the conventional high temperature gate valve.

Conventionally, a high temperature gate valve of this type includes a valve element (gate) 103 for opening and closing a flow path 102 and a guide device 104 for guiding the valve element 103 in an opening/closing direction Q provided in a valve body 101, as shown in FIGS. 10 and 11 for example. The valve body 101 includes a valve body main portion 105 and a bonnet portion 106 formed on an outer periphery of the valve body main portion 105.

The guide device 104 is formed by four guide rails 108. Each of the guide rails 108 is an elongate single member extending in the opening/closing direction Q, and fixed to an inner wall of the valve body 101 by welding. The welded portion 109 of the guide rail 108 is formed along the entire length of the guide rail 108.

In accordance with the above-mentioned structure, the valve element 103 retracts into the bonnet portion 106 when the valve element 103 moves to a fully-opened position such that a fluid 110 flows from an upstream side to a downstream side through the flow path 102. In this case, part of the fluid 110 flows into the bonnet portion 106 from inside of the valve body main portion 105. When the valve element 103 moves to a fully-closed (shut-off) position S, the flow path 102 is blocked by the valve element 103.

When the valve element 103 moves from the fully-opened position to the shut-off position S, nitrogen gas is injected into the bonnet portion 106 from outside such that the fluid 110 is pushed out from inside the bonnet portion 106 to the valve body main portion 105 and the bonnet portion 106 is filled with the nitrogen gas. Since the pressure of the nitrogen gas is higher than that of the fluid 110, the fluid 110 is prevented from entering the bonnet portion 106 from the upstream side of the valve element 103. Thus, the fluid 110 would not leak into the downstream side of the valve element 103 from the upstream side of the valve element 103 by circumventing it through the bonnet portion 106.

Since the valve element 103 is guided by the guide rail 108, vibration of the valve element 103 can be prevented when the valve element 103 moves along the opening/closing direction Q. For example, Japanese Utility Model Registration No. 2589344 (Y) describes such a high temperature gate valve 111.

BRIEF DESCRIPTION OF THE INVENTION

Problems to be Solved by the Invention

Figure 12:
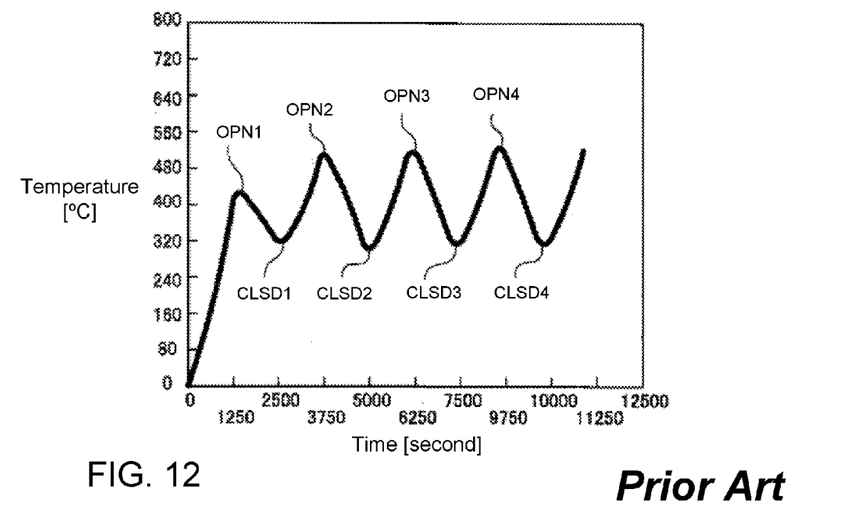
FIG. 12 is a graph showing a relationship between a length of operating time of the high temperature gate valve and a temperature of the guide rail.

However, in the case where the fluid 110 is a high temperature fluid about 700° C., the temperature of the guide rail 108 greatly varies every time the valve element 103 is opened or closed in the above-mentioned conventional structure. FIG. 12 a diagram graphically illustrates a temperature variation in the guide rail 108 with respect to the opening and closing of the valve element 103 by simulating the opening/closing conditions by numerical calculations, with time on the abscissa axis and the temperature of the guide rail 108 on the ordinate axis. When the valve element is opened (see OPN 1 through OPN 4), the high temperature fluid 110 flows into the bonnet portion 106 as well as flowing through the valve body main portion 105, and thus the guide rail 108 is heated by the fluid 110 to a very high temperature.

When the valve element 103 is closed (see CLSD 1 through CLSD 4), the inside of the bonnet portion 106 is filled with the nitrogen gas. Since the temperature of the nitrogen gas is lower than that of the fluid 110, the guide rail 108 becomes cooled by the nitrogen gas to a lower temperature.

Such an opening/closing operation of the valve element 103 is performed, for example, in every 20 minutes, and the temperature of the guide rail 108 greatly varies by each operation and the guide rail 108 repeatedly expands and contracts. At the same time, the temperature difference between the guide rail 108 and the valve body 101 causes differences in expansion and contraction ratios between the guide rail 108 and the valve body 101, which repeatedly generates an excessive thermal stress in the welded portion 109 of the guide rail 108. Such an excessive thermal stress causes a problem of shortening the life span of the welded portion 109 of the guide rail 108. Since there is a risk, after the life span of the welded portion 109, that the welded portion 109 fractures due to thermal fatigue, it is necessary to conduct a frequent check-up, maintenances, and repairs.

In order to countermeasure such a problem, instead of welding the guide rail 108 onto the inner wall of the valve body 101, as described in the above-mentioned Japanese Utility Model Registration No. 2589344 (Y), it is possible to provide a concave groove on the inner wall of the valve body 101 and a convex ridge portion on the guide rail 108 such that the ridge portion of the guide rail 108 engages with the groove of the valve body 101.

However, in such a structure in which the guide rail 108 is not completely fixed to the valve body 101, the guide rail 108 may undesirably vibrate due to a minute gap between the convex ridge portion and the concave groove.

An objective of the present invention is to provide a high temperature gate valve in which a guide member is securely fixed to the inside of a valve body and to prolong a life span of a welded portion of the guide member.

Means for Solving the Problems

In order to achieve the above-mentioned objective, the present invention provides a high temperature gate valve having a valve body, a valve element configured to open and close a flow path, and a guide member provided in the valve body. The guide member is configured to guide the valve element in an opening/closing direction. The valve body includes a valve body main portion having a flow path, and a bonnet portion. The valve element slides along the opening/closing direction guided by the guide member. The valve element at a closing position blocks the flow path by projecting into the valve body main portion, and at an opening position retracts into the bonnet portion from the valve body main portion. The guide member is divided into a plurality of divided guiding elements along the opening/closing direction, each of the divided guiding elements being welded to an inside of the valve body.

In accordance with this structure, the valve element is guided along the opening/closing direction in sliding contact with the guide member so as to smoothly move in the opening/closing direction.

Since each of the divided guiding elements is welded to the inside of the valve body, the guide member is securely fixed to the inside of the valve body. In addition, by dividing the guide member into a plurality of the divided guiding elements, an amplitude of plastic strains in the welded portion of the guide member is reduced so as to increase the number of repetitions of the thermal stresses applied thereto before the welded portion fractures, thereby prolonging the life span of the welded portion of the guide member.

The high temperature gate valve according to the present invention is provided with a gap formed between adjacent divided guiding elements as a buffer space for the thermal expansion.

In accordance with this structure, when the divided guiding elements are heated by the high temperature fluid flowing through the flow path in the valve body so as to cause a thermal expansion, although the gap is narrowed by the thermal expansion of the divided guiding elements, the opposing end portions of the adjacent divided guiding elements are still kept apart from each other without contact.

On the other hand, if the end portion of the divided guiding element and the opposing end portion of the adjacent divided guiding element interfere each other, the resulting stress is applied to the welded portion so as to shorten the life span of the welded portion. The high temperature gate valve in accordance with the present invention can prevent such an increase of the stress so as to prolong the life span of the welded portion.

In addition, in the high temperature gate valve in accordance with the present invention, each of the divided guiding elements is provided with a non-welded portion formed at ends of the divided guiding element. The non-welded portion is not welded to the valve body, while the welded portion extends in an area other than the non-welded portion along a longitudinal direction.

In accordance with this structure, since the non-welded portion is formed in an adjoining area in which the end portions of the adjacent divided guiding elements are next to each other, the welded portion is prevented from fracturing in the adjoining area.

On the other hand, if the welded portion is continuously formed from an end portion of the divided guiding element to another end portion of the adjacent divided guiding element without providing the non-welded portion at the respective end portions, there is a risk that the welded portion may fracture in the adjoining area of the divided guiding elements.

Furthermore, since the welded portion is continuously formed in the area other than the non-welded portion formed in the end portions of the divided guiding elements, a contact area for the welded portion and the divided guiding element and that for the welded portion and the valve body are both increased. Thus, when the heat is transmitted from the divided guiding element through the welded portion to the valve body, the heat transfer area in the welded portion is increased such that the temperature difference between the divided guiding element and the valve body is reduced, thereby reducing the thermal stress generated in the welded portion of the divided guiding element, and thus prolonging the life span of the welded portion.

In addition, craters formed in the end portion of the welded portion (depressions formed in an end of welding beads) are easily treated.

In the high temperature gate valve according to the present invention, the guide member includes a guiding surface in sliding contact with the valve element and extending along the opening/closing direction of the valve element, and a beveled portion formed by chamfering and provided at each end portion of the guiding surface of the adjacent divided guiding elements.

In accordance with this structure, the valve element slides along the guiding surface of the guide member in the opening/closing direction guided by the guide member. The valve element can smoothly move from the guiding surface of one of the divided guiding elements to another guiding surface of the adjacent divided guiding element next thereto.

In the high temperature gate valve according to the present invention, a length of the divided guiding elements is 200 mm to 400 mm.

Effect of the Invention

As described above, according to the present invention, the guide member can be securely fixed to the inside of the valve body, and at the same time, the life span of the welded portion of the guide member can be extended so as to reduce the number of check-ups, maintenances, and repairs. Thus, for example, a plant that continuously operates for two to four years may be prevented from being unexpectedly shut down.

Since the gap is formed as a buffer space for the thermal expansion, although the gap may be narrowed by the thermal expansion of the divided guiding elements, the end portion of the divided guiding element and the end portion of the adjacent divided guiding elements can be kept separated from each other so as to prevent stresses from increasing, thereby extending the life span of the welded portion.

Since the non-welded portion is formed in the adjoining area in which the end portions of the adjacent divided guiding elements are next to each other, the fracture of the welded portion in the adjoining area is prevented so as to extend the life span of the welded portion.

Since the area for the heat transfer from the divided guiding element to the valve body is increased, the temperature difference between the divided guiding element and the valve body is reduced so as to reduce the thermal stress generated in the welded portion of the divided guiding element, thereby prolonging the life span of the welded portion.

In addition, the craters formed in the end portion of the welded portion can be easily treated.

Since the valve element can smoothly move from one of the divided guiding elements to the adjacent divided guiding element next thereto, the opening and closing operations of the valve element can be performed smoothly.

DETAILED DESCRIPTION OF EMBODIMENTS OF THE INVENTION

Hereafter, embodiments in accordance with the present invention is described with reference to the drawings.

The First Embodiment

Figure 1:
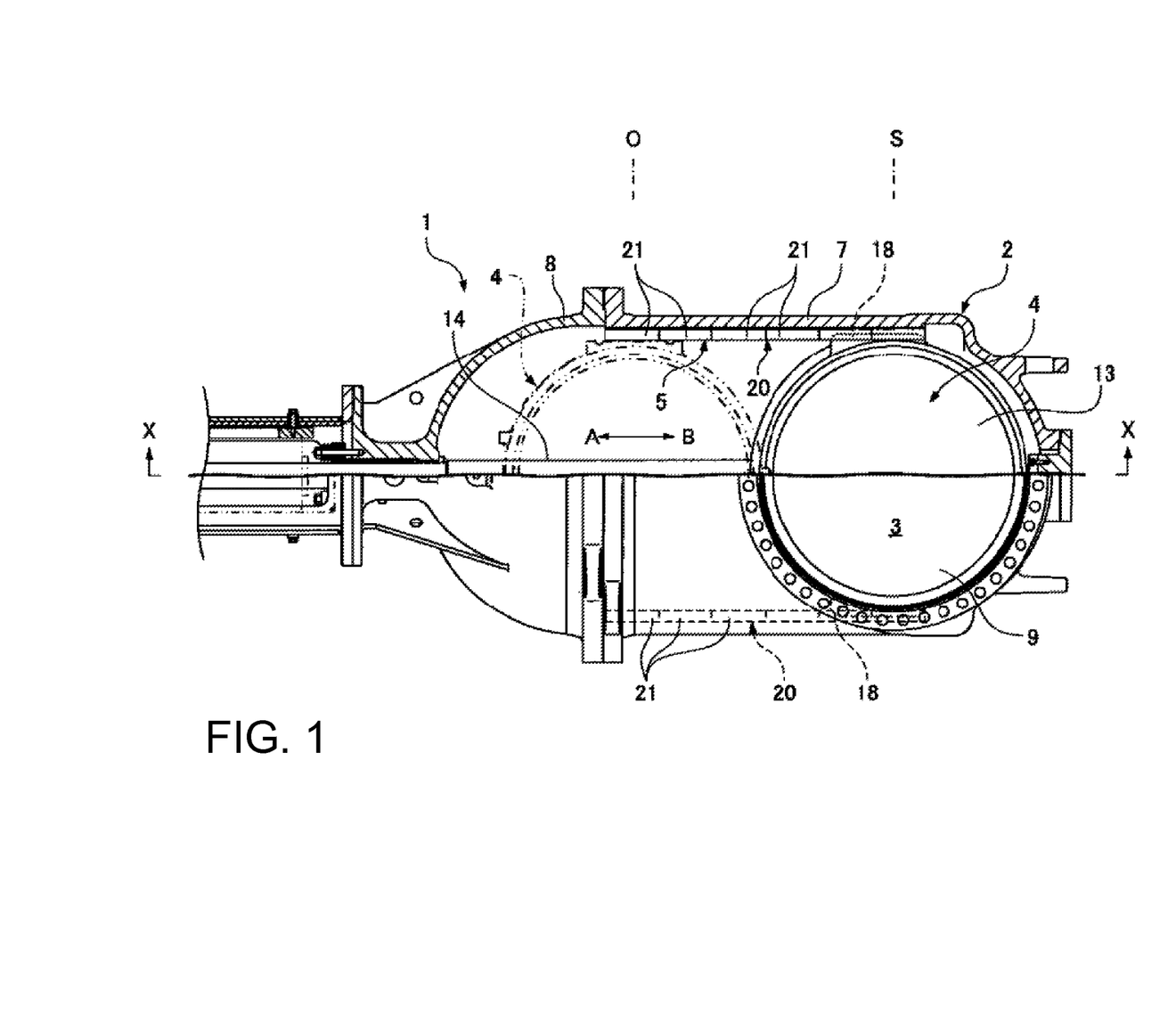
FIG. 1 is a diagram showing a view from an inflow mouth side of a high temperature gate valve in accordance with an embodiment of the present invention, with a one half thereof showing an external view and the other half showing a horizontal cross-sectional view.
Figure 2:
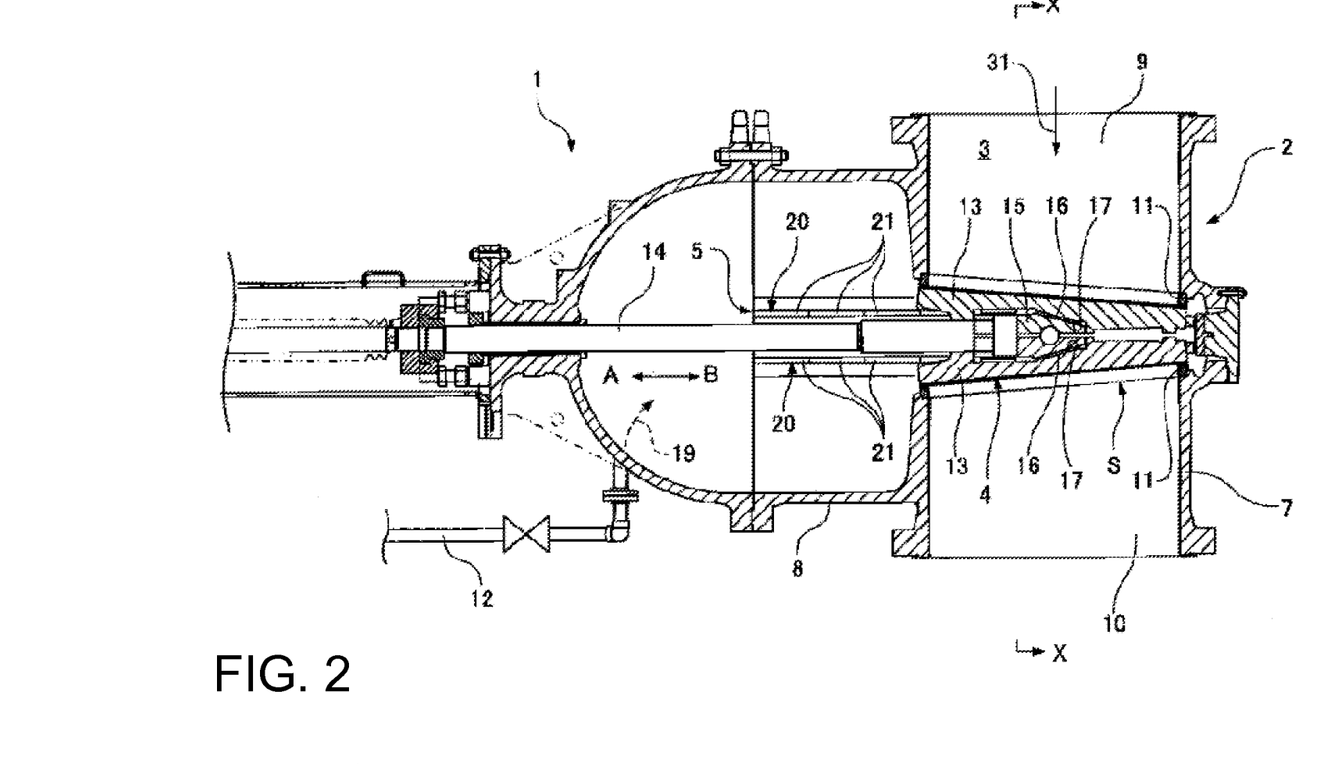
FIG. 2 is a diagram showing a cross-sectional view from arrows X-X in FIG. 1.

In accordance with the first embodiment, a high temperature gate valve 1 includes, in a valve body 2, a valve element (gate) 4 for opening and closing a flow path 3 in an up-down direction, and a guide device 5 for guiding the valve element 4 in the opening/closing directions A, B, as shown in FIGS. 1 and 2. The opening/closing directions are set in a horizontal direction perpendicular to the flow path 3.

The valve body 2 includes a valve body main portion 7 having the flow path 3 therein, and a bonnet portion (valve element housing portion) 8. The valve body main portion 7 has an inflow mouth 9 on an upper side and an outflow mouth 10 on a lower side.

The valve body main portion 7 is provided with a valve seat 11. The valve element 4, at a closing position S thereof, projects into the valve body main portion 7 so as to shut down the flow path 3. The inside of the valve body main portion 7 and the inside of the bonnet portion 8 are in communication with each other. The valve element 4, at an open position O thereof, retracts into the bonnet portion 8 from the valve body main portion 7. A purge pipe 12 is connected to the valve body 2 for injecting a purge gas, for example, nitrogen gas 19 into the bonnet portion 8.

Figure 4:
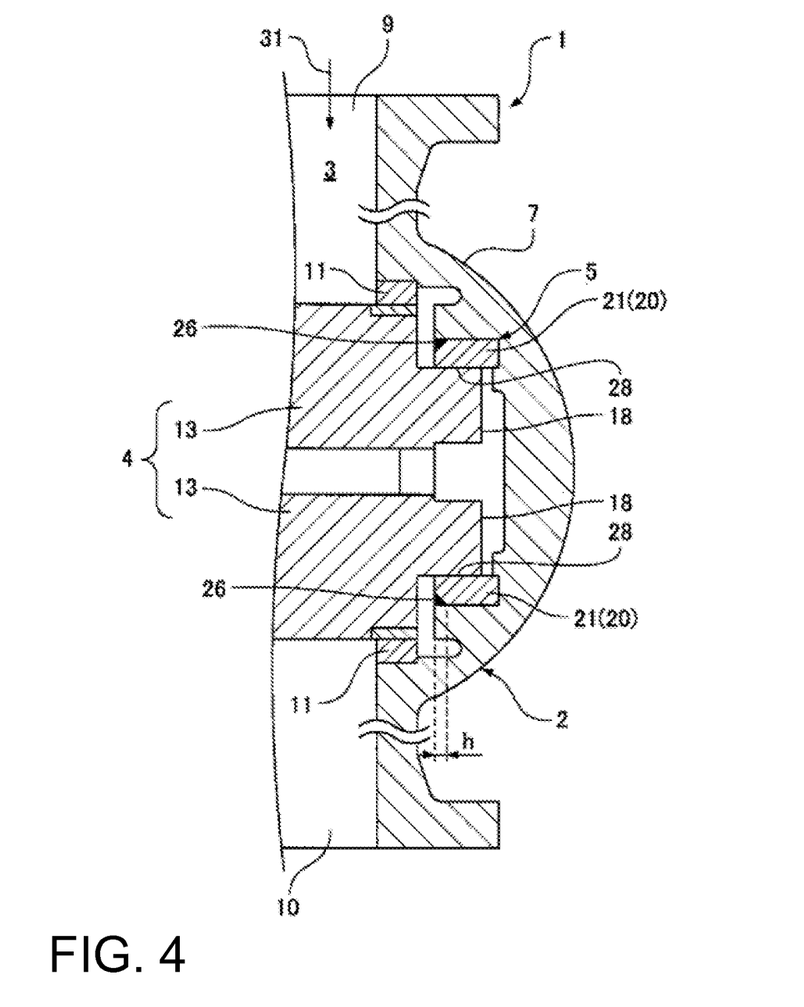
FIG. 4 is a diagram showing a cross-sectional view from arrows X-X in FIG. 2.

The valve element 4 is formed by a double disc 13 having a pair of upper and lower discs, and connected to an end portion of a valve stem 14. The valve stem 14 has a pair of wedges 15 at an end portion thereof. The wedges 15 are wedge-shaped members which narrow toward the end in the closing direction B, and have a pair of inclined surfaces 16. These inclined surfaces 16 abut a pressure receiving surface 17 formed on the double disc 13. As shown in FIGS. 1 and 4, the double disc 13 has guiding pieces 18 on both sides in a width direction thereof. The guiding pieces 18 protrude outwardly in a radial direction. The width direction of the double disc 13 of the valve element 4, the opening/closing directions A-B, and a shaft center direction of the flow path 3 are The guide device 5 is formed by four long guide rails 20 (an example of guide member) elongated in the opening/closing directions A-B. Each of the guide rails 20 is divided into six divided rail elements 21 (an example of a plurality of divided guiding elements) in the opening/closing directions A-B (an elongate direction). Each of the divided rail elements 21 has a rectangular cross-section, and is welded to an inner wall of the valve body 2.

Figure 5:
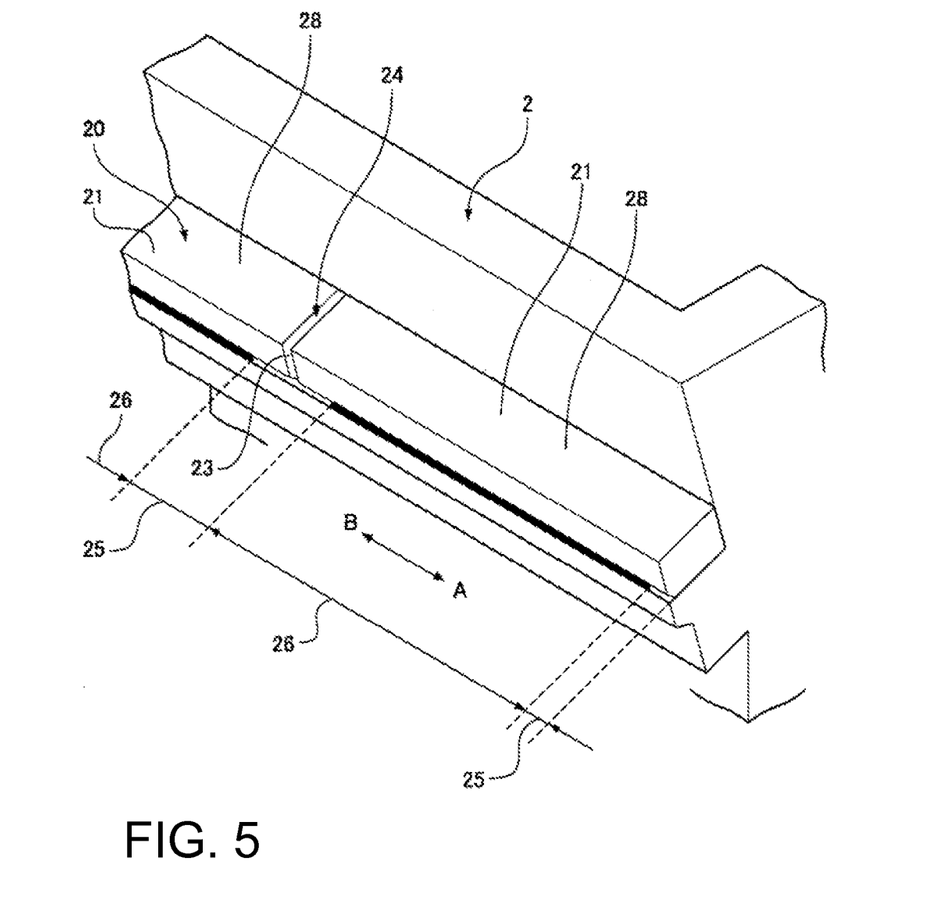
FIG. 5 is a diagram showing a perspective view of a guide rail of the high temperature gate valve in accordance with the embodiment of the present invention.
Figure 6:
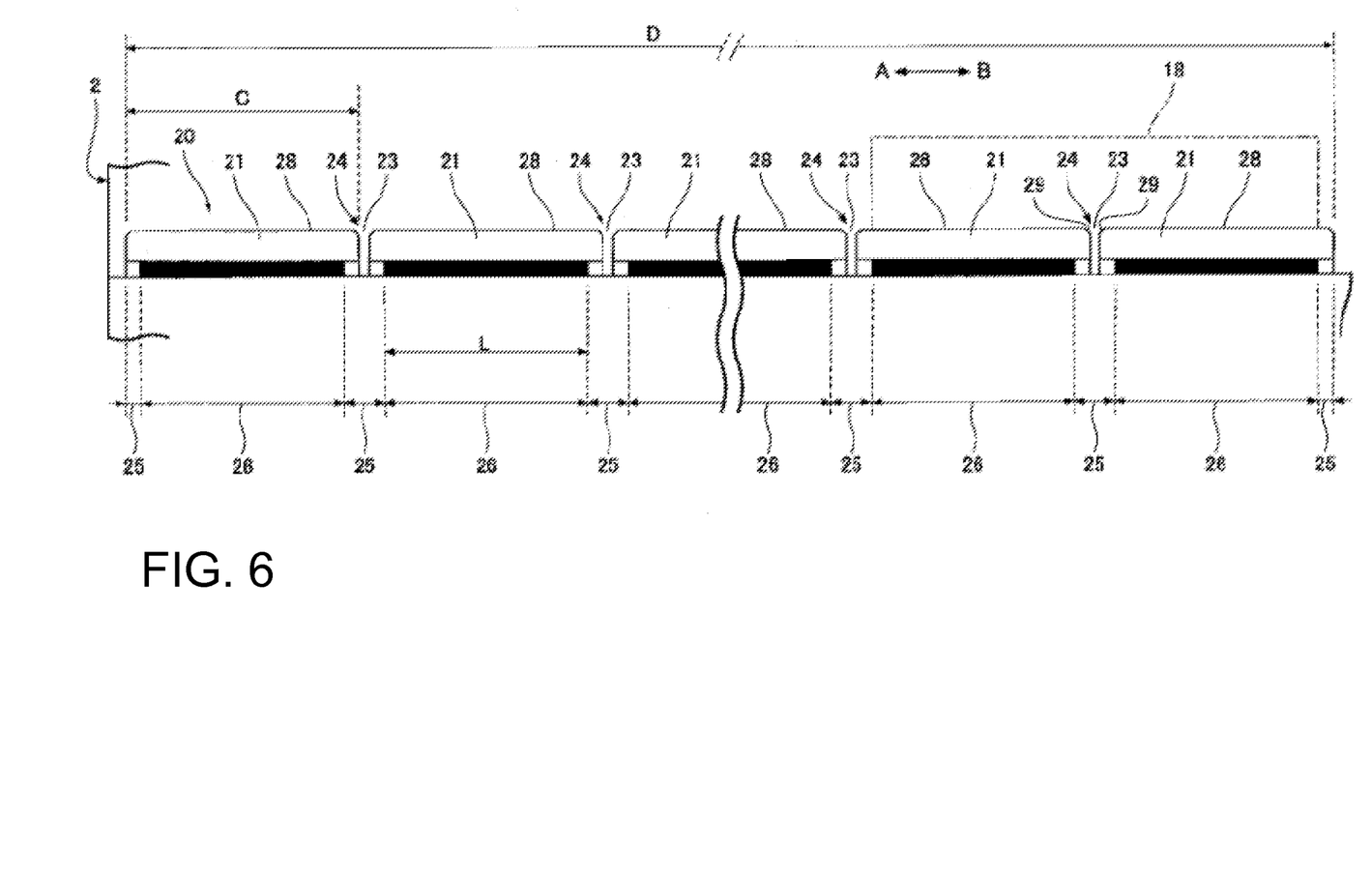
FIG. 6 is a diagram showing a side view of the guide rail of the high temperature gate valve in accordance with the embodiment of the present invention.
Figure 7:
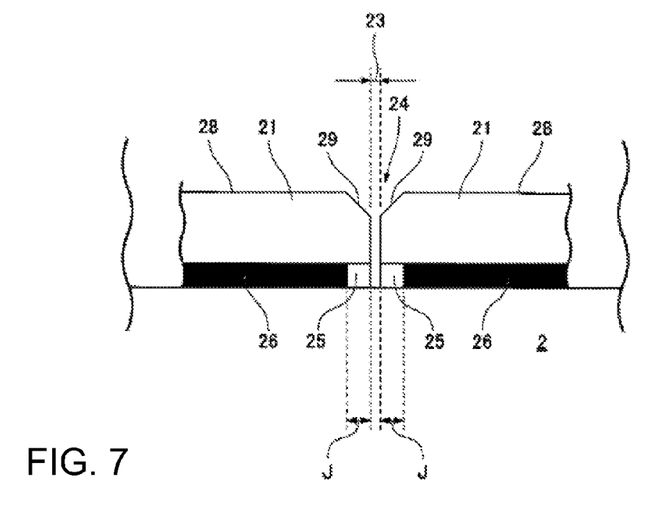
FIG. 7 is a diagram showing a magnified side view of an adjoining area of divided rail members of the guide rail of the high temperature gate valve in accordance with the embodiment of the present invention.

As shown in FIGS. 5 to 7, a gap 23 is formed between the adjacent divided rail elements 21 as a buffer space prepared for a thermal expansion. The size of the gap 23 at room temperature is set in consideration of the amount of the thermal expansion of the divided rail elements 21, and set to about 1 mm, for example.

A non-welded portion 25 which is not welded to the valve body 2 is formed in an adjoining area 24 where respective ends portions of the adjacent divided rail elements 21 are next to each other. The non-welded portion 25 is formed on both end portions of each of the divided rail elements 21, and, as shown in FIG. 7, has a length J of about 10 mm, for example. Welded portions 26 (shown as black portions in FIGS. 5 to 7) are continuously formed along the longitudinal direction of the divided rail element 21 in an area other than the non-welded portions 25. That is, each of the welded portions 26 is continuously formed between a non-welded portion 25 at one end portion of the divided rail element 21 and another non-welded portion 25 at the other end portion of the divided rail element 21.

The gap 23 may be formed by the following method: A part called cardboard liner is inserted between the divided rail elements 21 when the divided rail elements 21 are welded, and then the cardboard liner is incinerated by a heat process after the divided rail elements 21 have been welded, such that a space remaining after the incineration is obtained as the gap 23.

As shown in FIGS. 4-6, each of the guiding rails 20 includes a guiding surface 28 which is in sliding contact with the guiding piece 18 of the valve element 4 and extending along the opening/closing direction A-B. As shown in FIG. 7, a beveled portion 29 having a sloped surface formed by chamfering is provided at both of the adjacent end portions of the guiding surface 28 of the divided rail elements 21.

The valve body 2 and the guide rails 20 are, for example, made of a heat-resistant alloy steel, and the welded portions 26 are, for example, made of a heat-resistant nickel-chrome alloy and the like. As shown in FIG. 6, a length C of the divided rail elements 21 is set at 200 mm to 400 mm.

The functions of the above-mentioned structures are described below.

Figure 3:
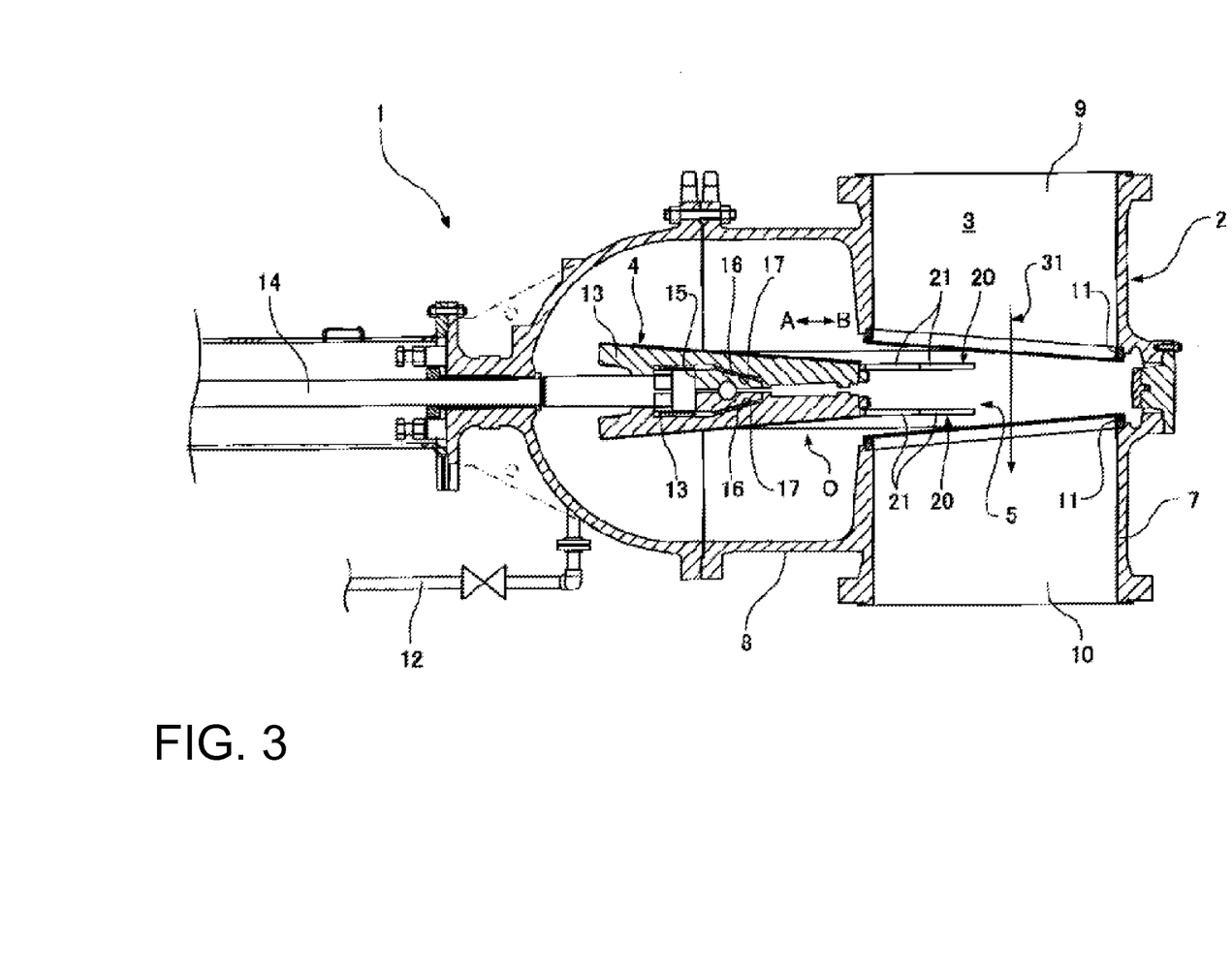
FIG. 3 is a diagram showing a longitudinal cross-sectional view of the high temperature gate valve in a fully-opened condition in accordance with the embodiment of the present invention.

As indicated by a dashed line in FIG. 1, and as shown in FIG. 3, when the valve element 4 moves to a fully-opened position O, the valve element 4 retracts into the bonnet portion 8, and a high temperature fluid 31, such as high temperature air or light hydrocarbon, flows through the flow path 3 from an upstream side to a downstream side. At the same time, part of the fluid 31 flows from the valve body main portion 7 into the bonnet portion 8. As indicated by a solid line in FIG. 1, and as shown in FIG. 2, when the valve element 4 moves to a fully-closed (shut-off) position S, the valve element 4 intrudes into the valve body main portion 7 and the slanted surface 16 of the wedge 15 comes into pressure contact with the pressure receiving surface 17 of the double disc 13 such that the double disc 13 is pressed onto the valve seat 11 so as to block off the flow path 2.

When the valve element 4 moves from the fully-opened position O to the shut-off position S, nitrogen gas 19 is injected from the purge pipe 12 into the bonnet portion 8 such that the fluid 31 inside the bonnet portion 8 is pushed out from the inside of the bonnet portion 8 and the bonnet portion 8 is filled with the nitrogen gas 19. Since the pressure of the nitrogen gas 19 is higher than that of the fluid 31, the fluid 31 is prevented from entering the bonnet portion 8 from the upstream side of the valve element 4 at the shut-off position S, and thus the fluid 31 would not leak into the downstream side of the valve element 4 from the upstream side of the valve element 4 by circumventing it through the bonnet portion 8.

Since the valve element 4 is guided by the guide rails 20 while moving in the opening/closing directions A-B, vibration of the valve element 4 in the shaft center direction of the flow path can be prevented. At this time, the guiding piece 18 of the valve element 4 moves along the opening/closing direction A-B in sliding contact with the guiding surface 28 of the guide rail 20, generating a sliding resistance therebetween.

As shown in FIG. 7, since the bevel portions 29 are formed on both sides of the guiding surface 28 of each of the divided rail elements 21, the guiding piece 18 of the valve element 4 can smoothly move from a guiding surface 28 of one of the adjacent divided rail elements 21 to a guiding surface 20 of the other of the adjacent divided rail elements 21.

Since each of the divided rail elements 21 is welded onto the inner wall of the valve body 2, the guide rail 20 is securely fixed to the inside of the valve body 2. As shown in FIG. 6, by dividing the guide rail 20 into a plurality of the divided rail elements 21, the amplitude of the plastic strains of the welded portion 26 is reduced, so as to increase the number of repetitions of the thermal stresses applied thereto before the welded portion 26 fractures, thereby prolonging the life span of the welded portion 26.

Figure 8:
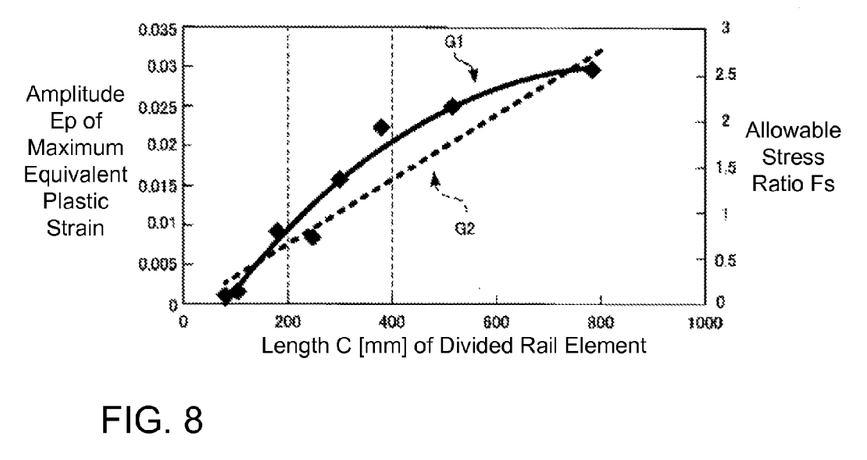
FIG. 8 is a graph showing relationships among a length of the divided rail member, the amplitude of the maximum equivalent plastic strain, and allowable stress ratio of the high temperature gate valve in accordance with the embodiment of the present invention.

For example, as illustrated in FIG. 8, a graph G1 represented by a solid line shows a relationship between the length C of the divided rail element 21 (see FIG. 6) and the amplitude Ep of the maximum equivalent plastic strain generated in the welded portion 26, in which black squares represent values of the amplitude Ep of the maximum equivalent plastic strain with respect to the length C of the divided rail element 21.

The length C of the divided rail element 21 on the abscissa axis of the graph G1 is, for example, a length obtained by dividing the guide rail 20 into two to sixteen elements where the entire length D of the guide rail 20 (see FIG. 6) is set to 1500 mm Table 1 below shows values of the length C. For example, when the guide rail 20 is divided into six divided rail elements 21, the length C of the divided rail element 21 is 250 mm

TABLE 1

| Number of Divisions | Length C of Divided Rail Element |
|---|---|
| Two | 750 mm |
| Three | 500 mm |
| Four | 375 mm |
| Five | 300 mm |
| Six | 250 mm |
| Eight | 187 mm |
| Thirteen | 115 mm |
| Sixteen | 94 mm |

In accordance with the graph G1 in FIG. 8, as the length C of the divided rail element 21 reduces by increasing the number of divisions of the guide rail 20, the amplitude Ep of the maximum equivalent plastic strain reduces.

In accordance with the Coffin-Manson law, the amplitude Ep of the equivalent plastic strain and the number Nf of repetitions thereof before the fracture have a relationship therebetween as expressed in Equation (1) below:

$$E_p \cdot N_f^{\frac{1}{2}} = 0.5 \cdot E_f \qquad \text{Equation (1)}$$

In Equation (1) above, Ef is a constant specific to a material of the welded portion 26 or the divided rail element 21. In accordance with the Equation (1) above, as the amplitude Ep of the equivalent plastic strain become smaller, the number Nf of repetitions before the fracture becomes greater, so as to prolong the life span of the welded portion 26.

The amplitude Ep of the maximum equivalent plastic strain on the left-side ordinate axis can be obtained by a numerical analysis. For example, if the valve element 4 is opened and closed four times in every 20 minutes starting from a room temperature, as shown in FIG. 12, relationships between the plastic train generated in the welded portion 26 and the time are illustrated by graphs Ga to Gc in FIG. 9. The graph Ga represented by a dotted line shows changes in the plastic strain when the guide rail 20 is divided into two (i.e., divided into two divided rail elements 21) as shown in Table 1. The graph Gb represented by a dashed line shows changes in the plastic strain when the guide rail 20 is divided into six (i.e., divided into six divided rail elements 21). The graph Gc represented by a solid line shows changes in the plastic strain when the guide rail 20 is divided into sixteen (i.e., divided into sixteen divided rail elements 21).

Figure 9:
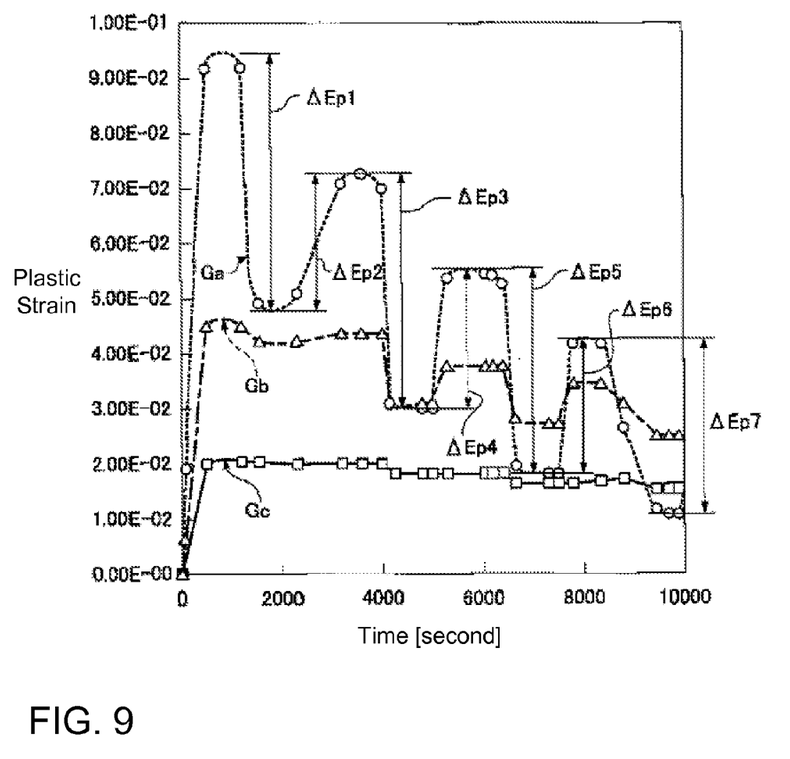
FIG. 9 is a graph showing a relationship between a length of operating time of the high temperature gate valve and the amplitude of the plastic strain, for each of the divided rail members having different lengths, in accordance with the embodiment of the present invention.

Here, the amplitude Ep of the maximum equivalent plastic strain is an average value of a plurality of individual amplitudes $\Delta Ep1 \sim \Delta Ep7$ obtained from each of the graphs Ga~Gc. That is, each of the amplitudes $\Delta Ep1 \sim \Delta Ep7$ is an amplitude between the corresponding peak and bottom of each graph, and the amplitude Ep of the maximum equivalent plastic strain for each of the lengths C of the divided rail element 21 is obtained from the following Equation (2).

$$Ep = (\Delta Ep1 + \Delta Ep2 + \Delta Ep3 + \Delta Ep4 + \Delta Ep5 + \Delta Ep6 + \Delta Ep7)/7 \qquad \text{Equation (2)}$$

It should be noted that the graphs Ga~Gc are based on the plastic strains obtained from a numerical analysis using the hardest conditions, as shown in FIG. 12, under which the opening/closing operation of the valve body 4 is performed once in every 20 minutes by starting from a room temperature such that opening and closing are each repeated four times, for the purpose of relative evaluation among different numbers of divisions of the guide rail 20 into the divided rail elements 21.

In addition, when the guiding piece 18 of the valve element 4 moves along the opening/closing direction A-B in sliding contact with the guiding surface 28 of the guide rail 20, a sliding resistance is generated therebetween. An allowable stress ratio Fs is defined for the welded portion 26 as an indication of the fixing strength thereof with respect to the sliding resistance. The graph G2 represented by a broken line in FIG. 8 shows a relationship between the length C of the divided rail element 21 and the allowable stress ratio Fs. The allowable stress ration Fs is obtained by the following Equation (3).

$$Fs = 0.8 \cdot \sigma s/\sigma \qquad \text{Equation (3)}$$

Here, the symbol σs denotes an allowable stress of a welding material of the welded portion 26, which is determined based on "ASME Boiler and Pressure Vessel Code Section VIII, Division 1, Section II, Part D." The symbol σ denotes a shear stress (N/mm²) generated in the welded portion 26. The shear stress σ is obtained by the following Equation (4).

$$\sigma = \frac{Fm + Fp}{0.5 \cdot h \cdot L} = \frac{M \cdot g \cdot \mu + \Delta P \cdot S}{0.5 \cdot h \cdot L} \quad \text{Equation (4)}$$

Here, the symbol Fm denotes a load (N) from the weight of the valve element 4, the symbol Fp denotes a load (N) due to a pressure difference between the upstream and downstream of the gate valve 1, the symbol h denotes a leg length (mm) of the welded portion 26 shown in FIG. 4, and the symbol L denotes a length (mm) of the welded portion 26 shown in FIG. 6. The symbol M denotes a mass (kg) of the valve element 4, the symbol μ denotes a friction coefficient between the guiding piece 18 of the valve element 4 and the guide rail 20, the symbol g denotes the acceleration of gravity (m/s²), the symbol ΔP denotes the pressure difference between the upstream and downstream (N/mm²), the symbol S denotes an opening area of the inlet mouth 9 (mm²), and the numerical value 0.5 in the denominator of the Equation (4) denotes a weld efficiency.

The loads Fm and Fp are applied to a contact portion of the guiding piece 18 on the downstream side of the valve element 4 and the guide rail 20. Ideally, the load Fm from the weight of the valve element 4 is equally distributed over the entire surface of the contact portion of the guiding piece 18 and the guide rail 20. However, the present embodiment assumes that the load Fm is not equally distributed but concentrated onto one the divided rail elements 21 so as to obtain the shear stress σ generated in the welded portion 26. In accordance with the Equation (4) above, the shear stress σ increases as the length L of the welded portion 26 becomes smaller, and thus the allowable stress ratio Fs decreases in accordance with the Equation (3), whereby the fixing strength of the welded portion 26 with respect to the sliding resistance generated by the opening/closing movement of the valve element 4 decreases.

Accordingly, as illustrated by the graphs G1 and G2 in FIG. 8, as the lengths C of the divided rail elements 21 is shortened by increasing the number of divisions of the guide rail 20, the amplitude Ep of the maximum equivalent plastic strain becomes smaller so as to reduce the effect of the thermal stress, while the allowable stress ratio Fs lowers and thus the fixing strength of the welded portion 26 with respect to the sliding resistance generated by the opening/closing movement of the valve element 4 tends to be reduced. Accordingly, although shortening the length C of the divided rail elements 21 is desirable to reduce the effect of the thermal stress, it is not desirable in the light of the fixing strength. Therefore, in order to take a balance between the reduction of the effect of the thermal stress and the fixing strength so as to obtain a sufficient life span of the welded portion 26 and a range of the allowable stress ratio Fs from 1 to 1.5, the length C of the divided rail elements 21 is set at 200~400 mm.

In addition, as shown in FIG. 3, when the valve element 4 moves to the fully-open position O such that the high temperature fluid 31 flowing through the flow path 3 within the valve body 2 heats the divided rail elements 21 and causes thermal expansion thereof, an end portion of the divided rail element 21 and an opposing end portion of the adjacent divided rail element 21 are kept separated without contacting each other, since the width of the gap 23 is set in consideration of the amount of the thermal expansion of the divided rail elements 21, as shown in FIG. 6, such that the gap 23 is narrowed by the amount of the thermal expansion.

On the other hand, if the end portion of the divided rail element 21 and the opposing end portion of the adjacent divided rail element 21 come into contact with and push against each other, the resulting stress is applied to the welded portion 26 so as to shorten the life span of the welded portion 26. The high temperature gate valve 1 in accordance with the embodiment of the present invention can prevent the increase of the stress and thereby prolong the life span of the welded portion 26.

Furthermore, since the non-welded portions 25, in place of the welded portion 26, are formed in the adjoining area 24 of the divided rail elements 21, fracture of the welded portion 26 in the adjoining area 24 can be prevented.

On the other hand, if the welded portion 26 is continuously formed from one end of the divided rail elements 21 to the other end thereof without forming the non-welded portion 25 in the end portions, there is a risk that the welded portion 26 fractures in the adjoining area 24. The high temperature gate valve 1 in accordance with the embodiment of the present invention can prevent such fracture of the welded portion 26.

Furthermore, since the welded portion 26 is continuously formed in an area other than the non-welded portion 25 formed in the end portion of the divided rail elements 21, a contact area of the welded portion 26 and the divided rail element 21 and that between the welded portion 26 and the valve body 2 are both increased. Thus, when the heat is transmitted from the divided rail element 21 through the welded portion 26 to the valve body 2, the heat transfer area in the welded portion 26 is increased such that the temperature difference between the divided rail element 21 and the valve body 2 is reduced so as to reduce the thermal stress generated in the welded portion 26 of the divided rail element 21, thereby prolonging the life span of the welded portion 26.

In addition, since the non-welded portion 25 is formed between the end portion of the welded portion 26 of the divided rail element 21 and the opposing end portion of another welded portion 26 of the adjacent divided rail element 21, the craters formed at the end portions of the welded portion 26 (depressions formed in an end of welding beads) are easily treated.

Although an example of the guide rail 20 having the total length D of 1500 mm is explained in the embodiment described above, as shown in FIG. 6, the total length D is not limited to 1500 mm, but similar results can be obtained for the total length D other than 1500 mm. The numerical values shown in the embodiment are examples and thus are not limiting to specific values.

In the embodiment described above, although a planar sloped surface is formed as an example of the beveled portion 29 by chamfering a corner of the guiding surface 28, as shown in FIG. 7, an arc-like curved surface can be used instead of the sloped surface.

What is claimed is:
1. A high temperature gate valve comprising:
   a valve body including:
      a valve body main portion having a flow path; and
      a bonnet portion;
   a valve element configured to open and close the flow path by moving between an open position and a closing position along an axis; and
   a plurality of guide members provided in the valve body, configured to guide the valve element in an axis direction, wherein the valve element slides along the axis direction guided by the guide members, the valve element at the closing position blocking the flow path by projecting into the valve body main portion, and at the open position retracting into the bonnet portion from the valve body main portion, and wherein each of the guide members is divided into a plurality of guiding elements divided in the axis direction, the plurality of guiding elements in each of the guide members being aligned in the axis direction, a gap being formed between adjacent guiding elements in the axis direction, each of the guiding elements being welded to an inside of the valve body.

2. The high temperature gate valve according to claim 1, wherein the gap formed between adjacent guiding elements provides a buffer space for a thermal expansion.

3. The high temperature gate valve according to claim 1, wherein each of the guiding elements includes:
  a non-welded portion provided at ends of the guiding element, the non-welded portion not being welded to the valve body; and
  a welded portion extending along a longitudinal direction in an area other than the non-welded portion.

4. The high temperature gate valve according to claim 1, wherein each of the guide members includes:
  a guiding surface located on each of the guiding elements, the guiding surface extending along the axis direction of the valve element and having an end portion at both ends thereof, the guiding surface being in sliding contact with the valve element; and
  a beveled portion formed by chamfering, provided at each end portion of the guiding surface of each of the guiding elements, the end portion facing another end portion of the guiding surface of an adjacent guiding element.

5. The high temperature gate valve according to claim 1, wherein a length of the guiding elements is 200 mm to 400 mm.

6. The high temperature gate valve according to claim 2, wherein each of the guiding elements includes:
  a non-welded portion provided at ends of the guiding element, the non-welded portion not being welded to the valve body; and
  a welded portion extending along a longitudinal direction in an area other than the non-welded portion.

7. The high temperature gate valve according to claim 2, wherein each of the guide members includes:
  a guiding surface located on each of the guiding elements, the guiding surface extending along the axis direction of the valve element and having an end portion at both ends thereof, the guiding surface being in sliding contact with the valve element; and
  a beveled portion formed by chamfering, provided at each end portion of the guiding surface of each of the guiding elements, the end portion facing another end portion of the guiding surface of an adjacent guiding element.

8. The high temperature gate valve according to claim 3, wherein each of the guide members includes:
  a guiding surface located on each of the guiding elements, the guiding surface extending along the axis direction of the valve element and having an end portion at both ends thereof, the guiding surface being in sliding contact with the valve element; and
  a beveled portion formed by chamfering, provided at each end portion of the guiding surface of each of the divided elements, the end portion facing another end portion of the guiding surface of an adjacent guiding element.

9. The high temperature gate valve according to claim 2, wherein a length of the guiding elements is 200 mm to 400 mm.

10. The high temperature gate valve according to claim 3, wherein a length of the guiding elements is 200 mm to 400 mm.

11. The high temperature gate valve according to claim 4, wherein a length of the guiding elements is 200 mm to 400 mm.

* * * * *